US012308503B2

(12) United States Patent
Bianchi

(10) Patent No.: US 12,308,503 B2
(45) Date of Patent: May 20, 2025

(54) FREQUENCY SELECTIVE ELECTRICAL FILTER

(71) Applicant: Advantest Corporation, Tokyo (JP)

(72) Inventor: Giovanni Bianchi, Ehningen (DE)

(73) Assignee: Advantest Corporation, Tokyo (JP)

( * ) Notice: Subject to any disclaimer, the term of this patent is extended or adjusted under 35 U.S.C. 154(b) by 180 days.

(21) Appl. No.: 17/845,825

(22) Filed: Jun. 21, 2022

(65) Prior Publication Data

US 2022/0320699 A1 Oct. 6, 2022

Related U.S. Application Data

(63) Continuation of application No. PCT/EP2020/053351, filed on Feb. 10, 2020.

(51) Int. Cl.
*H01P 1/203* (2006.01)

(52) U.S. Cl.
CPC .................................. *H01P 1/2039* (2013.01)

(58) Field of Classification Search
CPC .. H01P 1/203; H01P 1/20381; H01P 1/20363; H01P 1/20; H01P 1/213; H01P 1/2039; H01P 1/202; H01P 1/2135; H01P 1/20336; H01P 5/12; H01P 1/205; H01P 1/20345; H01P 1/2136; H01P 1/207; H01P 1/2138; H01P 1/201; H01P 1/2056; H01P 3/081; H01P 5/04; H01P 1/20372; H03H 7/0138; H03H 7/0115; H03H 7/38; H03H 7/0123; H03H 7/0161
See application file for complete search history.

(56) References Cited

U.S. PATENT DOCUMENTS 8,067,997 B2 * 11/2011 Melde ........................ H01P 5/04
333/32
9,490,511 B2 * 11/2016 Ueda .......................... H01P 1/19
2010/0060388 A1 * 3/2010 Ueda ........................ H01P 1/203
333/236
2011/0102111 A1 * 5/2011 Wang .................... H01P 1/2039
333/204

(Continued)

OTHER PUBLICATIONS

Yu-Chen Chen et al; "Direct synthesis of a bandpass filter with a controllable transmission zero", Microwave Conference Proceedings (APMC), 2010 Asia-Pacific, IEEE, Dec. 7, 2010 (Dec. 7, 2010), pp. 1962-1965, XP031928749, ISBN: 978-1-4244-759-2 section II; p. 1962-p. 1963k table I figures 1-3.

(Continued)

*Primary Examiner* — John W Poos

(57) ABSTRACT

Embodiments of the present invention provide an electrical filter structure having a direct-coupled-stub filter (DCSF). The lengths of the transmission line portions can be arranged such that electrical lengths of the transmission line portions are shorter, by at least 10 percent, than a fourth of a wavelength of a signal having a frequency of a passband center frequency of the electrical filter structure. Moreover, lengths of the stubs can be selected so that the electrical lengths of the stubs are longer, by at least 2%, than a fourth of a wavelength of a signal having a frequency of a passband center frequency of the electrical filter structure. The filter structures of embodiments of the present invention can advantageously improve filter characteristics without changing the topological structure of the filter.

19 Claims, 8 Drawing Sheets

(56) References Cited

U.S. PATENT DOCUMENTS

| | | | | |
|---|---|---|---|---|
| 2013/0200961 A1* | 8/2013 | Bianchi | H03H 7/0123 | 333/175 |
| 2013/0249650 A1* | 9/2013 | Bianchi | H03H 7/38 | 333/32 |

OTHER PUBLICATIONS

Frank; et al; "Chebyshev Bandpass Filter Designer", Feb. 12, 2018, Retrieved from the Internet: URL: https://https://www.changpuak.ch/electronics/chebyshev_bandpass.php [retrieved on Oct. 19, 2020] the whole document.

* cited by examiner $$Z_{OPEN\_CKT\_STUB}(\omega) = -j\cdot Z_0\cdot \cot\left(\frac{\pi}{4}\cdot\frac{\omega}{\omega_0}\right)$$

$$Z_{SHORT\_CKT\_STUB}(\omega) = j\cdot Z_0\cdot \tan\left(\frac{\pi}{4}\cdot\frac{\omega}{\omega_0}\right)$$

$$Z_{OPEN\_CKT\_STUB}(\omega)\ //\ Z_{SHORT\_CKT\_STUB} =$$

$$\frac{-j\cdot Z_0\cdot \cot\left(\frac{\pi}{4}\cdot\frac{\omega}{\omega_0}\right) j\cdot Z_0\cdot \tan\left(\frac{\pi}{4}\cdot\frac{\omega}{\omega_0}\right)}{-j\cdot Z_0\cdot \cot\left(\frac{\pi}{4}\cdot\frac{\omega}{\omega_0}\right)+j\cdot Z_0\cdot \tan\left(\frac{\pi}{4}\cdot\frac{\omega}{\omega_0}\right)} = j\cdot Z_0\cdot\frac{1}{\frac{\cos\left(\frac{\pi}{4}\cdot\frac{\omega}{\omega_0}\right)}{\sin\left(\frac{\pi}{4}\cdot\frac{\omega}{\omega_0}\right)}-\frac{\sin\left(\frac{\pi}{4}\cdot\frac{\omega}{\omega_0}\right)}{\cos\left(\frac{\pi}{4}\cdot\frac{\omega}{\omega_0}\right)}} = j\cdot Z_0\cdot\frac{\sin\left(\frac{\pi}{4}\cdot\frac{\omega}{\omega_0}\right)\cdot\cos\left(\frac{\pi}{4}\cdot\frac{\omega}{\omega_0}\right)}{\left[\cos\left(\frac{\pi}{4}\cdot\frac{\omega}{\omega_0}\right)\right]^2-\left[\sin\left(\frac{\pi}{4}\cdot\frac{\omega}{\omega_0}\right)\right]^2} =$$

$$= j\cdot Z_0\cdot\frac{1}{2}\cdot\frac{\sin\left(2\cdot\frac{\pi}{4}\cdot\frac{\omega}{\omega_0}\right)}{\cos\left(2\cdot\frac{\pi}{4}\cdot\frac{\omega}{\omega_0}\right)}$$

$$Z_{OPEN\_CKT\_STUB}(\omega)\ //\ Z_{SHORT\_CKT\_STUB} = j\cdot\frac{Z_0}{2}\cdot\tan\left(\frac{\pi}{4}\cdot\frac{\omega}{\omega_0}\right)$$

Fig. 7

FREQUENCY SELECTIVE ELECTRICAL FILTER

CROSS-REFERENCE TO RELATED APPLICATIONS

This application claims the benefit of and priority to international patent application PCT/EP2020/053351, with filing date Feb. 10, 2020, which is hereby incorporated by reference in its entirety.

FIELD

Embodiments of the present invention relate to the field of electrical filters. More specifically, embodiments relate to the field of microwave electrical filters.

BACKGROUND

Electrical filter structures are used in many applications. For example, electrical filter structures may be implemented as a low-pass filter, a bandpass filter, or a high-pass filter. FIG. 1 depicts an example of a conventional direct-coupled-stub-filter (DCSF). The DCSF is a classical microwave filter structure. The conventional DCSF consists of N short-circuited stubs (ST1, . . . STN) interleaved by N−1 transmission lines (TL1, . . . TLN−1). All the stubs and all the transmission lines have the same electrical length, e.g., a quarter of a wavelength (λ/4) at the center frequency of the filter pass-band ($f_0$).

Normally, the filter is symmetrical, in that it is expressed as ST1=STN, ST2=STN−1, . . . and TL1=TLN−1, TL2=TLN−2, STk=STN+1−k TLk=TLN−k, k=1, 2, . . . floor(N/2). These filters are particularly suitable for printed applications, for example, for use as microstrips or straplines. In the example of FIG. 1, port 1 and port 2 are RF (radio frequency) ports of the filter, with one being the input port and the other being the output port.

As with many distributed RF/microwave filters, the DCSF has a periodic frequency response, with an infinite number of pass-bands centered at $f_0$, 3 $f_0$, . . . (2 h+1)*$f_0$ (h=0, 1, 2, . . . ). In each pass-band the frequency response is symmetrical around its respective center.

FIG. 2 depicts sample responses of a conventional DCSF. As shown in FIG. 2, a main band-pass is indicated with a dashed-line (the first 3 pass-bands only), and the main band-pass can be mirrored around any axis x=(2h+1)*$f_0$ without changing its shape. Normally, the filter is used in the "first window", e.g., for the frequency ranging from zero to slightly above 2$f_0$ (the exact value depends on the accepted stop-band rejection). Regarding the conventional DCSF, several well-known issues can make it more difficult to achieve an ideal response.

First, the stubs (ST1, . . . STN) and the transmission lines (TL1, . . . TLN−1) of the filter depicted in FIG. 1 (which generates a response like the one shown as FIG. 2) are loss-free elements that are punctiformly joined. Second, true and physically realizable stubs and transmission lines present dissipation loss, which normally increases with the frequency. Consequently, the power transfer ratio is higher than the ideal case in the pass-band ("stop-band"). Moreover, the pass-band additional attenuation increases with the frequency passing from the center to the edge of the pass-band. Third, the junction between two transmission lines and on the stub cannot be punctiform, but rather includes "connecting" elements (see FIG. 3) that behave as discontinuities with effects that are more impactful as the frequency increases. The response becomes only approximately periodic, with increasing irregularities at higher h. Fourth, as the frequency increases, the cross dimensions of stubs and transmission lines become significant in comparison to the wavelength, and the response at higher frequency becomes increasingly more irregular and less predictable.

FIGS. 3A and 3B show examples of realized conventional DCSFs. FIG. 3A represents a single stub structure and FIG. 3B represents a double inner-stub structure. As indicated in FIG. 3A, each stub is short circuited via a ground connection GND which is connected via-hole. In the example of FIG. 3A, stub ST1 is coupled to a first port P1 and a transmission line TL1 via T junction 10, stub ST 2 is coupled to the transmission line TL1 and a transmission line TL2 via T junction 10, and stub ST7 is coupled to transmission line TL6 and a second port P2 via T junction 10. The filter structure of FIG. 3B shows stub ST1' coupled to a first port P1 and a transmission line TL1' via T junction 10, and stub ST7' coupled to a transmission line TL6' and a second port Ps via T junction 10. However, as indicated in FIG. 3B, the DCSF has a double inner-stubs and therefore, other than the stubs ST1' and ST7', the double-inner stubs are coupled to transmission lines via cross junction 20. For example, stubs ST2' are coupled to transmission line TL1' and transmission line TL2' via cross junction 20, and stubs ST2' are located symmetrically about the transmission line.

The filter design depicted in FIG. 3 utilizes an additional free design parameter "d", which can represent the length of the transmission line and/or the length of the stub. By adjusting the additional design parameter d, it is possible to design a filter such that all the stubs with very similar characteristic impedance, or such that the characteristic impedance of the outer stubs is about twice the ones of the inner stubs. In the first case (very similar characteristic impedance), the most convenient implementation is the one depicted as FIG. 3A. In the second case (similar characteristic impedance), it is better to use two inner stubs with double characteristic impedance in parallel, as depicted in FIG. 3B.

Usually a design model simulation of a filter differs from the real response of the filter; with the difference at the low-pass side being especially large. As indicated in FIG. 2, a relatively sharp low-pass side is required to realize ideal main pass band. Therefore, a filter concept or structure that facilitates the implementation of a desired filter characteristic using readily available real-world technology is desired.

SUMMARY

Accordingly, embodiments of the present invention provide an electrical filter structure having a direct-coupled-stub filter (DCSF). The lengths of the transmission line portions can be arranged such that electrical lengths of the transmission line portions are shorter, by at least 10 percent, than a fourth of a wavelength of a signal having a frequency of a passband center frequency of the electrical filter structure. Moreover, lengths of the stubs can be selected so that the electrical lengths of the stubs are longer, by at least 2%, than a fourth of a wavelength of a signal having a frequency of a passband center frequency of the electrical filter structure. The filter structures of embodiments of the present invention can advantageously improve filter characteristics without changing the topological structure of the filter.

According to one embodiment, an electrical filter structure is disclosed. The electrical filter structure includes a microwave filter including a passband center frequency, a transmission line including a plurality of transmission line portions coupled to a plurality of junctions, a plurality of stubs coupled to the transmission line, a first port coupled to a first junction of the plurality of junctions, a first stub of the plurality of stubs is disposed at the first junction, a second port coupled to a last junction of the plurality of junctions, and a last stub of the plurality of stubs is disposed at the last junction.

According to some embodiments, the plurality of stubs include electrical lengths that are at least 2% longer than a quarter of a wavelength of a signal having a frequency of the passband center frequency of the microwave filter.

According to some embodiments, the microwave filter has a symmetrical structure.

According to some embodiments, the plurality of stubs includes N stubs having lengths, SST(s), with 1≤s≤N and N−1 transmission line portions having lengths, TLs, and the plurality of stubs are configured according to ST(k)=ST(N+1−k), [k≤floor(N/2)], where k is a positive integer.

According to some embodiments, the plurality of transmission line portions are configured according to the equation TL(k)=TL(N−k), [k≤floor(N/2)].

According to some embodiments, the microwave filter includes a Chebyshev filter characterized with a pass-band ripple of 0.1 dB in a tolerance of +/−5 percent.

According to some embodiments, the microwave filter includes a Chebyshev filter characterized with a pass-band ripple of 0.1 dB in a tolerance of +/−2 percent.

According to some embodiments, the microwave filter includes a band pass filter.

According to some embodiments, lengths of the transmission line portions are such that electrical lengths of the plurality of transmission line portions are shorter by between 15 to 50 percent of a fourth of a wavelength of a signal having a frequency of the passband center frequency of the electrical filter structure.

According to some embodiments, lengths of the plurality of stubs are such that their electrical lengths are 5 percent longer than a fourth of a wavelength of a signal having a frequency of the passband center frequency of the electrical filter structure.

According to some embodiments, lengths of the plurality of stubs are selected, and their electrical lengths are 2 percent longer than a fourth of a wavelength of a signal having a frequency of the passband center frequency of the electrical filter structure.

According to some embodiments, electrical lengths of the plurality of transmission line portions are at least 10 percent shorter than a quarter of a wavelength of a signal having the frequency of the passband center frequency of the microwave filter.

According to another embodiment, an electrical filter structure is disclosed, including a microwave filter including a passband center frequency, a transmission line including a plurality of transmission line portions coupled by a plurality of junctions, the plurality of transmission line portions include a length (TL), a plurality of stubs (N) coupled to the transmission line, a first port coupled to a first junction of the plurality of junctions, and a second port coupled to a last junction of the plurality of junctions. The plurality of stubs include a length (SST), and SST is determined according to the equation SST(k)=SST(N+1−k), where k is a positive integer.

According to some embodiments, the plurality of stubs include electrical lengths that are at least 2% longer than a quarter of a wavelength of a signal having a frequency of the passband center frequency of the microwave filter.

According to some embodiments, the microwave filter has a symmetrical structure.

According to some embodiments, the plurality of stubs includes N stubs having lengths, SST(s), with 1≤s≤N and N−1 transmission line portions having lengths, TLs, and the plurality of stubs are configured according to the equation ST(k)=ST(N+1−k), [k≤floor(N/2)], where k is a positive integer.

According to some embodiments, the plurality of transmission line portions are configured according to TL(k)=TL(N−k), [k≤floor(N/2)].

According to some embodiments, the microwave filter includes a Chebyshev filter characterized with a pass-band ripple of 0.1 dB in a tolerance of +/−5 percent.

According to some embodiments, the microwave filter includes a Chebyshev filter characterized with a pass-band ripple of 0.1 dB in a tolerance of +/−2 percent.

According to some embodiments, the microwave filter includes a band pass filter.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7 depicts a proof of circuit equivalence of the DCSF according to embodiments of the present invention.

DETAILED DESCRIPTION

Figure 1:
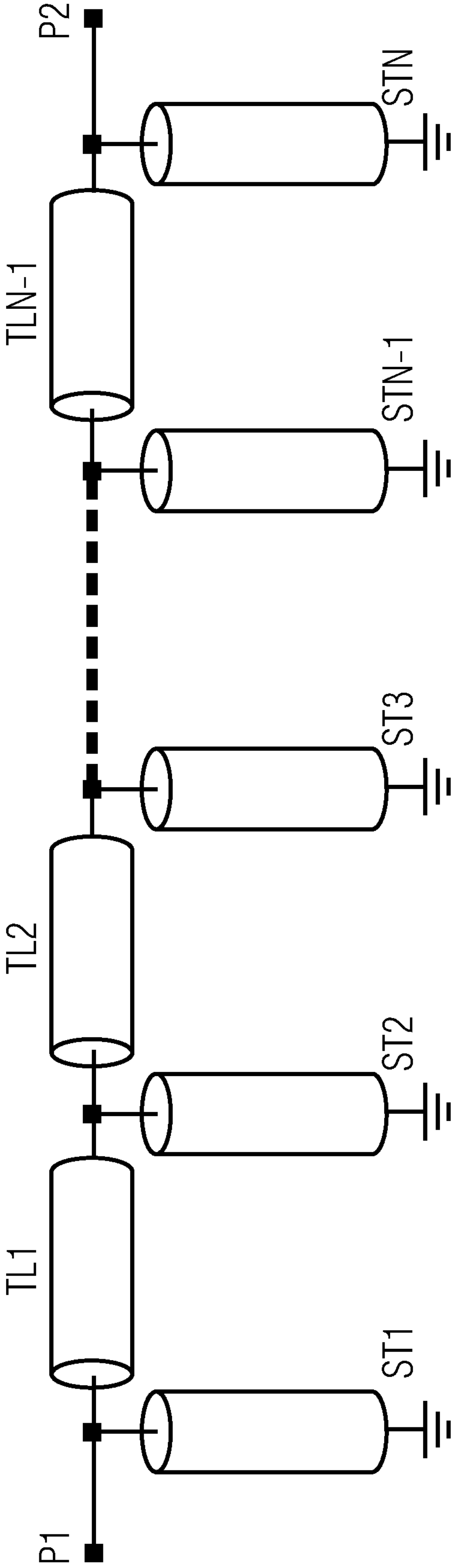
FIG. 1 is diagram of exemplary direct-coupled-stub filters (DCSF).
Figure 2:
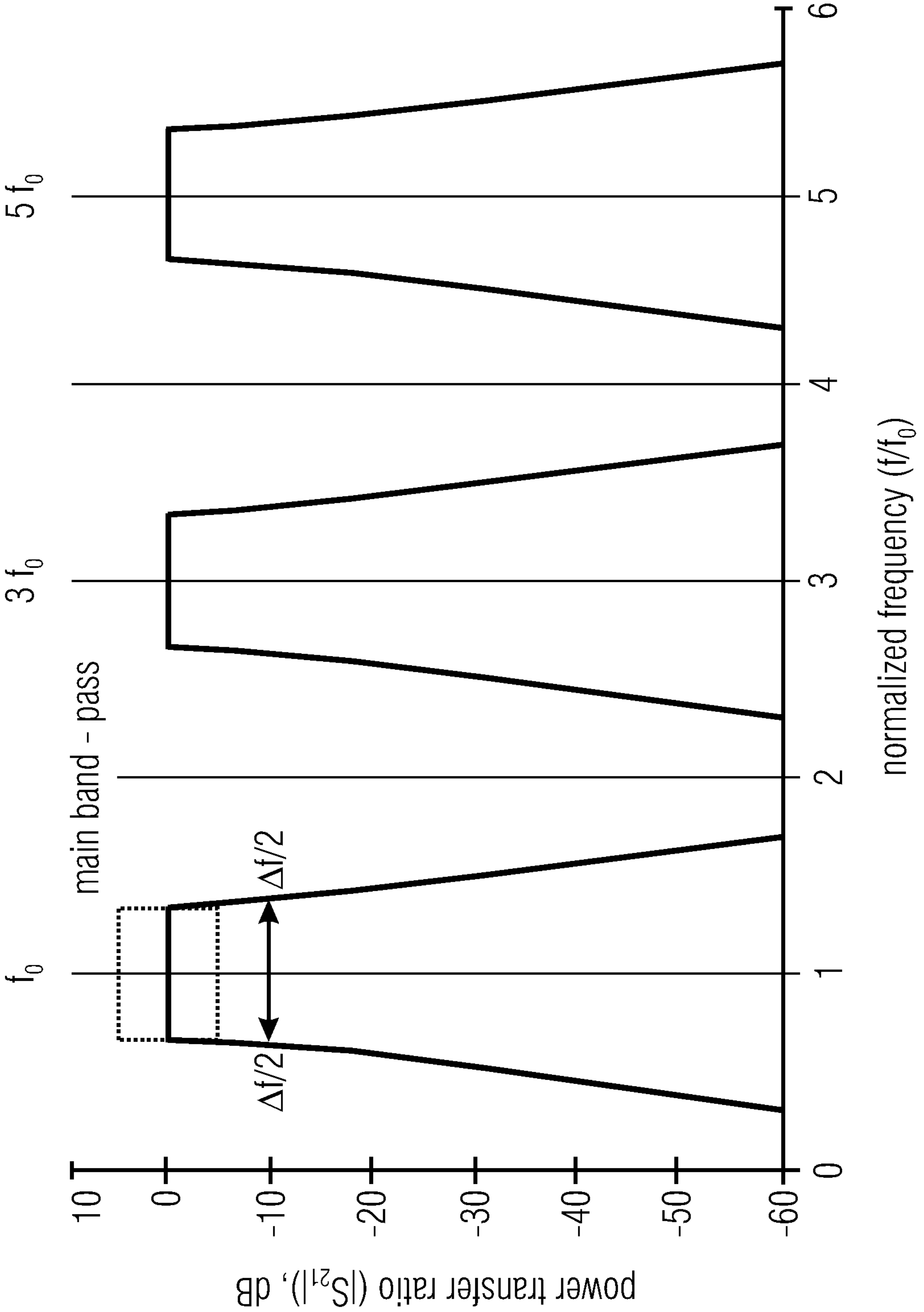
FIG. 2 is a graph of exemplary responses of an ideal DCSF.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, parameters, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "associating," "identifying," "encoding," "labeling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, algorithms, programs, objects, components, data structures, etc. that perform particular tasks or implement particular abstract data types. Typically the functionality of the program modules may be combined or distributed as desired in various embodiments.

Figure 3A:
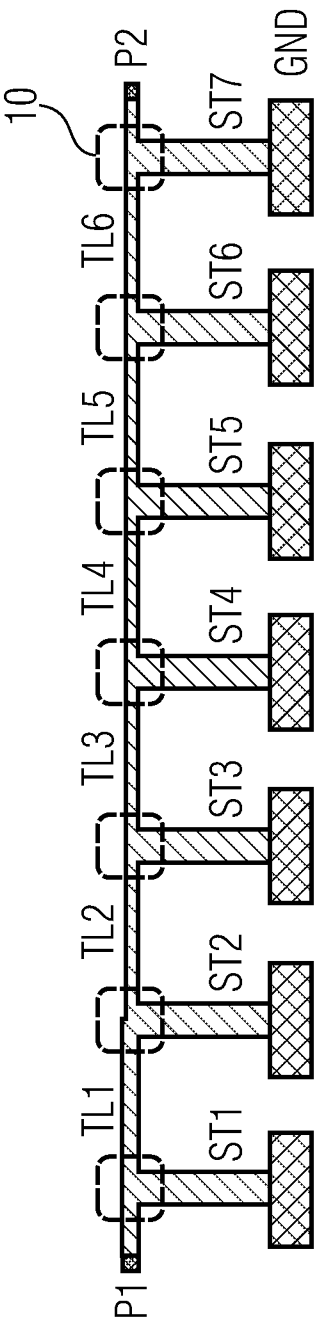
FIG. 3*a* is a diagram of an exemplary printed DCSF.
Figure 3B:
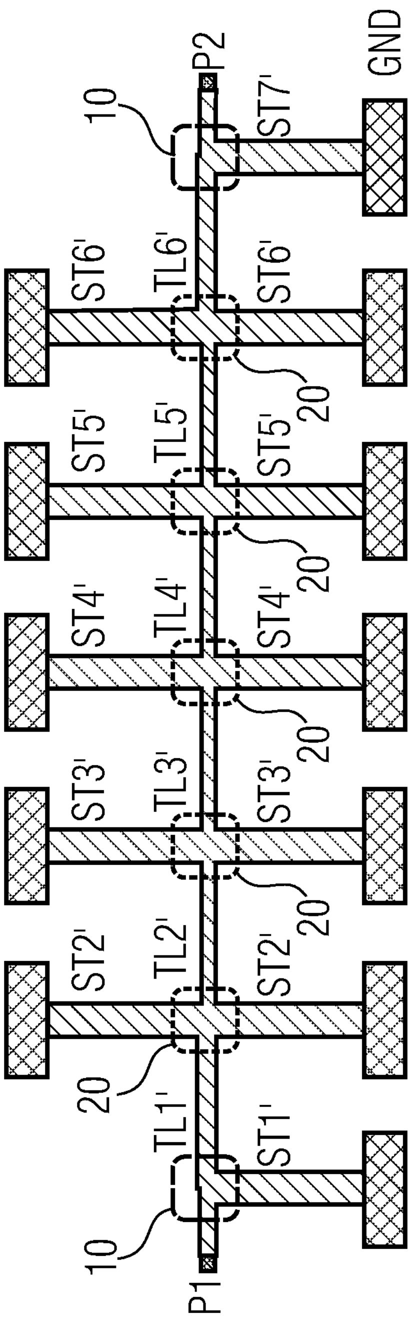
FIG. 3*b* is a diagram of an exemplary printed DCSF including a double inner-stub structure.

Embodiments of the present invention provide an electrical filter structure having a direct-coupled-stub filter (DCSF). The DCSF can be configured as depicted in in FIG. 3*a* or FIG. 3*b*, for example. Moreover, the lengths of the transmission line portions can be arranged such that electrical lengths of the transmission line portions are shorter, by at least 10 percent, than a fourth of a wavelength of a signal having a frequency of a passband center frequency of the electrical filter structure.

Moreover, lengths of the stubs can be selected so that the electrical lengths of the stubs are longer, by at least 2%, than a fourth of a wavelength of a signal having a frequency of a passband center frequency of the electrical filter structure.

When the electrical filter structure includes N stubs having lengths SST(s), with $1 \le s \le N$ and N−1 transmission line portions having lengths TLs, and the stubs are configured to fulfill a formula (1) within a tolerance of +/−5 percent or +/−2 percent, the transmission line portions are configured to fulfill a formula (2) within a tolerance of +/−5 percent or +/−2 percent:

$$SST(k)=SST(N+1-k) \quad (1), [k \le \text{floor}(N/2)]$$

$$\text{TL}(k)=\text{TL}(N-k) \quad (2), [k \le \text{floor}(N/2)]$$

k=a positive integer.

Figure 4A:
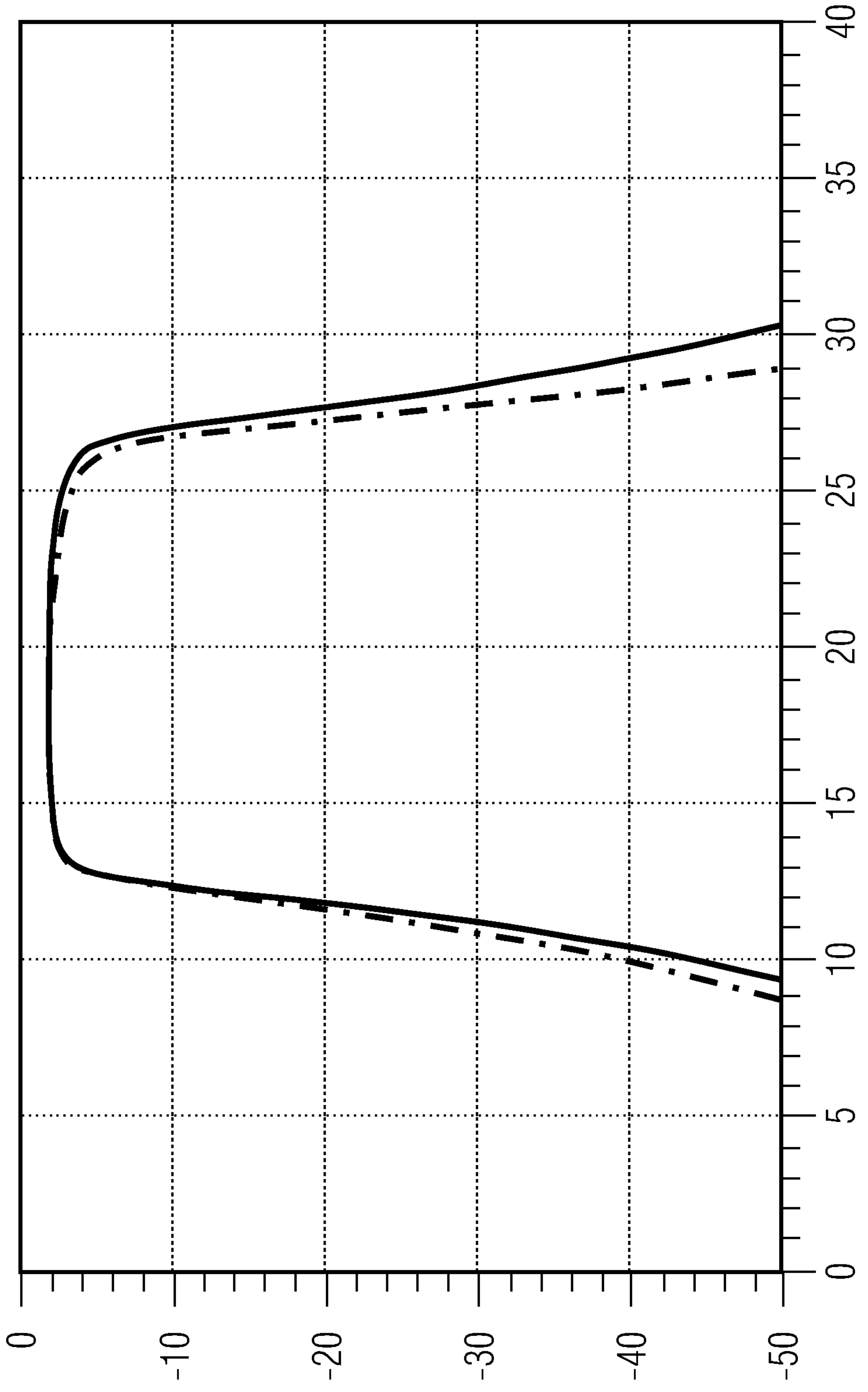
FIG. 4*a* is a graph of an exemplary simulated DCSF response according to embodiments of the present invention.
Figure 4B:
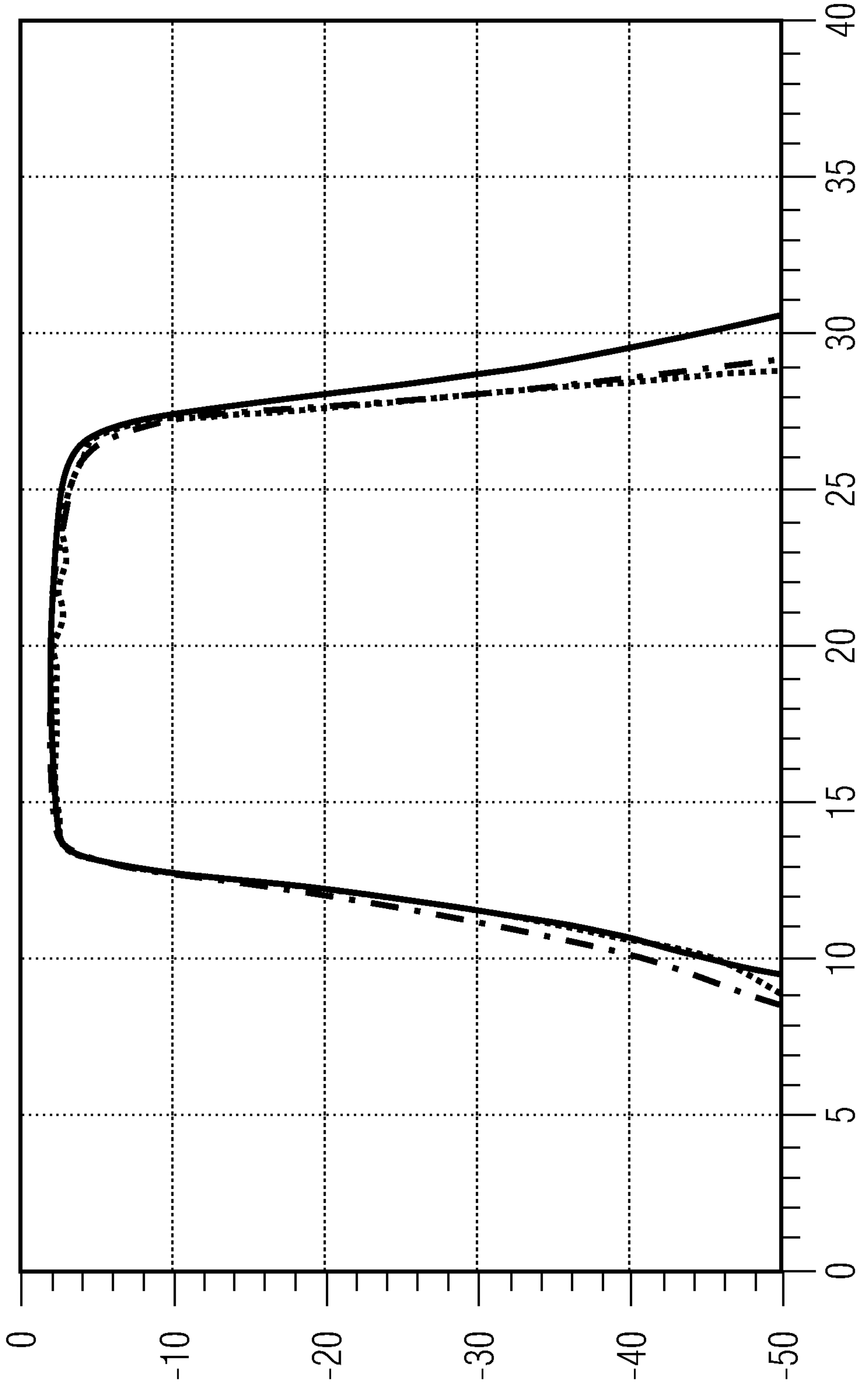
FIG. 4*b* is a graph of an exemplary measured DCSF response according to embodiments of the present invention.

FIG. 4(*a*) shows an exemplary response of a simulated DCSF using a conventional structure compared to an exemplary DCSF using a structure according to embodiments of the present invention (e.g., DCSF 600 or 650). FIG. 4(*b*) shows a measured response of a realized filter according to embodiments of the present invention. In FIGS. 4*a* and 4*b*, the response of the conventional DCSF is indicated as a long dashed line, and the response of the DCSF using a structure according to embodiments of the present invention is indicated as a dash-dot line. The measured result of the realized DCSF according to the first embodiment of the present application is indicated as a line. The x-axis shows the frequency in GHz, and they-axis shows the power transfer ratio ($|S_{21}|$) in dB.

According to some embodiments, the criterion for simulating/designing DCSF is: DCSFs with N=9, pass-band 13 to 26 GHz; Chebyshev design with pass-band ripple of 0.1 dB (in-band return—loss~16.4 dB); and Semi-ideal models for stubs and transmission lines (including loss).

As indicated in FIG. 4(*a*), the response of the conventional DCSF can have better selectivity at the high-pass side than the other DCSF. At the low-pass side, the DCSF having a structure according to embodiments of the present invention has a better selectivity.

According to FIG. 4(*b*), the measured response of the DCSF seems to be better than the response of the simulated DCSF. That is, as shown in FIG. 4(*b*), the high-pass selectivity of the measured response is almost the same as the conventional design, and the low-pass selectivity is almost the same of the simulated DCSF according to embodiments. Therefore, the DCSF can provide better selectivity of the pass-band to improve the characteristic of the electrical filter by adjusting the length of the transmission line portions and/or the length of the stubs.

Figure 5:
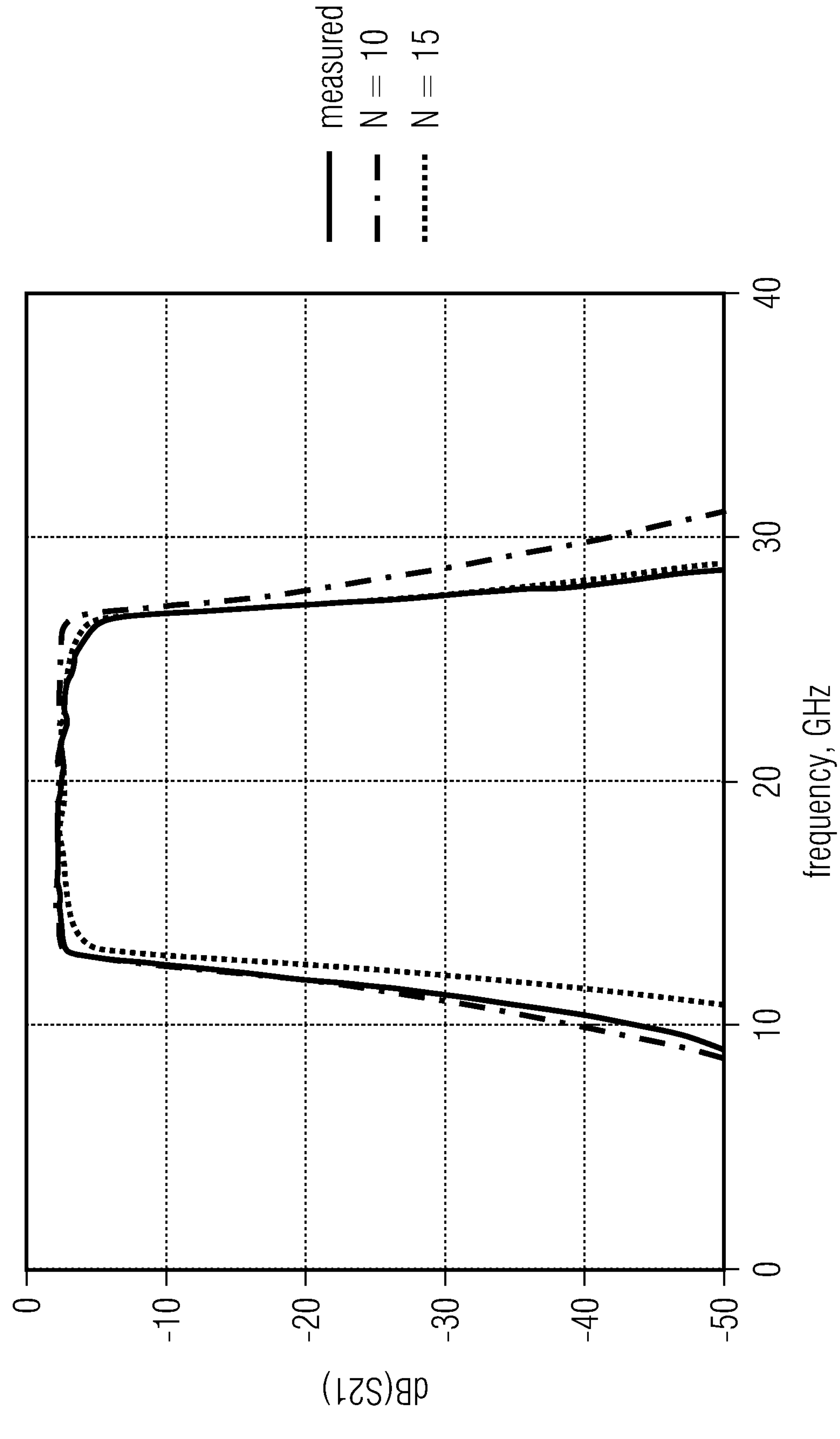
FIG. 5 is a graph of an exemplary response of a conventional DCSF compared to an exemplary measured result of a DCSF according to embodiments of the present invention.

FIG. 5 shows responses of conventional DCSF Chebyshev filters with different orders, e.g., a combination of a $15^{th}$ order filter and $10^{th}$ order filter. The response of the $15^{th}$ order filter is indicated as dotted line and the response of the $10^{th}$ order filter is indicated as dot-dashed line in FIG. 5. The conventional DCSFs operates as a pass-band ripple with 0.2 dB dissipation loss considered to simulate the response. The discrepancy with the response indicated in FIG. 4 on order and pass-band ripple are mainly due to the fact that the filter is purely ideal (with losses) and canonical, while the DCSF is redundant in that the transmission lines generate some additional selectivity.

As indicated in FIG. 5, the exemplary filter structure according to embodiments of the present invention shows an equivalent order of 15 in the low-pass side, with an improvement of 50% over existing solutions. Moreover, the filter structures of embodiments of the present invention can advantageously improve filter characteristics without changing the topological structure of the filter.

As a modification, the lengths of the transmission line portions can be selected so that electrical lengths of the transmission line portions are shorter, between 15 to 50 percent (preferably between 20 to 35 percent), than a fourth of a wavelength of a signal having a frequency of a passband center frequency of the electrical filter structure. In addition, the lengths of the stubs are selected such that electrical lengths of the stubs are longer, between 2 to 5 percent, than a fourth of a wavelength of a signal having a frequency of a passband center frequency of the electrical filter structure.

Figure 6A:
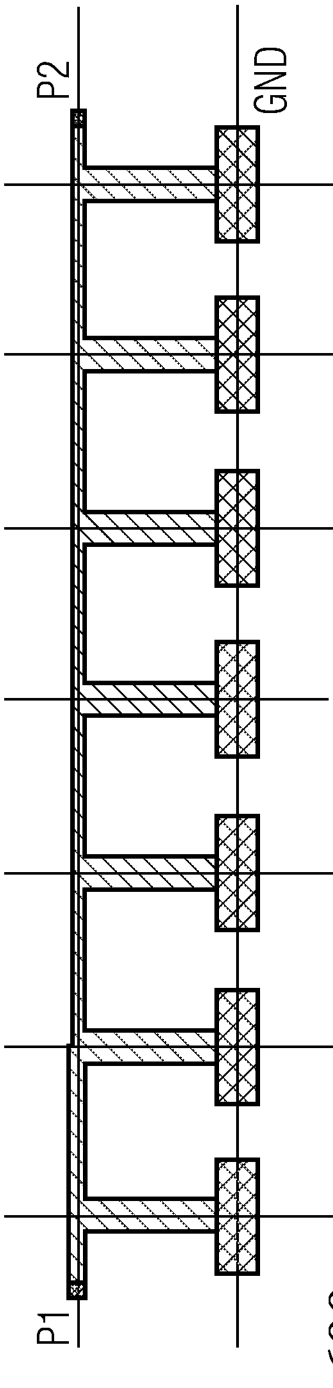
FIG. 6*a* is a diagram of an exemplary DCSF according to a embodiments of the present invention.
Figure 6B:
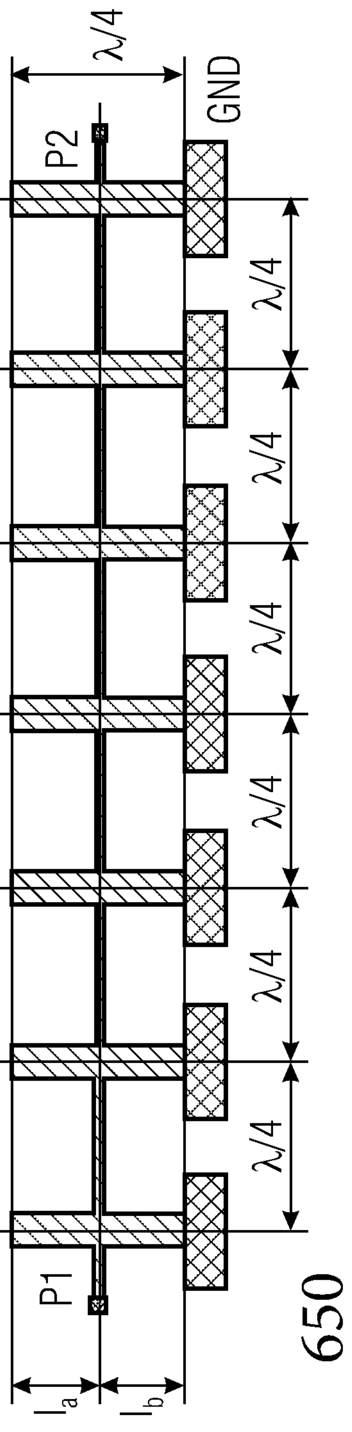
FIG. 6*b* is a diagram of an exemplary DCSF having two stubs in parallel according to a embodiments of the present invention.

FIG. 6(*a*) shows an exemplary DCSD 600 according to embodiments of the present invention. FIG. 6(*b*) shows a DCSF 650 having two stubs in parallel (one open-circuited and one short-circuited) with the same electrical length and characteristic impedance according to embodiments of the present invention.

The structure of DCSF 650 as depicted in FIG. 6(*b*) is a variation of the embodiment depicted in FIG. 6(*a*). The DCSF structure of FIG. 6(*b*) is based on a circuit equivalence, e.g., with two stubs in parallel (one open-circuited and one short-circuited) with the same electrical length and characteristic impedance, which are equivalent to a single short-circuited stub with double electrical length and half characteristic impedance as indicated in FIG. 6(*a*). The proof of the circuit equivalence is indicated in FIG. 7. In the ideal case it is $l_a=l_b=\lambda/8$, i.e., within tolerance of +/−10%.

Furthermore, lengths of the transmission line portions can be such that electrical lengths of the transmission line portions are shorter, by at least 10 percent, than a fourth of a wavelength of a signal having a frequency of a passband center frequency of the electrical filter structure. In this case, the lengths of the transmission line portions are such that electrical lengths of the transmission line portions are shorter by between 15 to 50 percent (preferably between 20 to 35 percent) of a fourth of a wavelength of a signal having a frequency of a passband center frequency of the electrical filter structure.

As a modification, according to some embodiments, the microwave filter has a symmetrical structure, and the electrical filter structure includes N short-circuited stubs having lengths, SST(s), with 1≤s≤N, N open stubs having lengths, OSTs, and N−1 transmission line portions having lengths, TL. The short-circuited stubs are configured based on formula (1), the open stubs are configured based on formula (2), and the transmission lines are configured based on formula (3):

$$SST(k)=SST(N+1-k) \quad (1),\ [k\le \text{floor}(N/2)]$$

$$OST(k)=OST(N+1+k) \quad (2),\ [k\le \text{floor}(N/2)]$$

$$\text{TL}(k)=\text{TL}(N-k) \quad (3),\ [k\le \text{floor}(N/2)]$$

k=a positive integer.

According to other embodiments, the microwave filter is a Chebyshev filter having a pass-band ripple of 0.1 dB in a tolerance of +/−5 percent or +/−2 percent. In addition, the microwave filter is a band pass filter. Furthermore, the open stub and the short-circuited stub of a pair have the same characteristic impedance. In addition, the electrical length of the open stub and short-circuited stub of the respective pairs is an eighth of a wavelength of a signal having a frequency of a passband center frequency of the electrical filter structure in tolerance of +/−2 to 5%.

Embodiments of the present invention are thus described. While the present invention has been described in particular embodiments, it should be appreciated that the present invention should not be construed as limited by such embodiments, but rather construed according to the following claims.

What is claimed is:

1. An electrical filter structure comprising:

a microwave filter comprising a passband center frequency;

a transmission line comprising a plurality of transmission line portions coupled to a plurality of junctions;

a plurality of stubs coupled to the transmission line, wherein the plurality of stubs comprise electrical lengths that are at least 2% longer than a quarter of a wavelength of a signal having a frequency of the passband center frequency of the microwave filter;

a first port coupled to a first junction of the plurality of junctions, wherein a first stub of the plurality of stubs is disposed at the first junction; and a second port directly connected to a last junction of the plurality of junctions, wherein a last stub of the plurality of stubs is disposed at the last junction.

2. The electrical filter structure according to claim 1, wherein the microwave filter has a symmetrical structure.

3. The electrical filter structure according to claim 1, wherein the plurality of stubs comprises N stubs having lengths, SST(s), with 1≤s≤N and N−1 transmission line portions having lengths, TLs, wherein the plurality of stubs are configured according to ST(k)=ST(N+1−k), [k≤floor(N/2)], wherein k is a positive integer.

4. The electrical filter structure according to claim 3, wherein the plurality of transmission line portions are configured according to the equation TL(k)=TL(N−k), [k≤floor (N/2)].

5. The electrical filter structure according claim 1, wherein the microwave filter comprises a Chebyshev filter characterized with a pass-band ripple of 0.1 dB in a tolerance of +/−5 percent.

6. The electrical filter structure according claim 1, wherein the microwave filter comprises a Chebyshev filter characterized with a pass-band ripple of 0.1 dB in a tolerance of +/−2 percent.

7. The electrical filter structure according to claim 1, wherein the microwave filter comprises a band pass filter.

8. The electrical filter structure according to claim 1, wherein lengths of the transmission line portions are such that electrical lengths of the plurality of transmission line portions are shorter by between 15 to 50 percent of a fourth of a wavelength of a signal having a frequency of the passband center frequency of the electrical filter structure.

9. The electrical filter structure according to claim 1, wherein lengths of the plurality of stubs are such that their electrical lengths are 5 percent longer than a fourth of a wavelength of a signal having a frequency of the passband center frequency of the electrical filter structure.

10. The electrical filter structure according to claim 1, wherein lengths of the plurality of stubs are selected, wherein their electrical lengths are 2 percent longer than a fourth of a wavelength of a signal having a frequency of the passband center frequency of the electrical filter structure.

11. The electrical filter structure according to claim 1, wherein electrical lengths of the plurality of transmission line portions are at least 10 percent shorter than a quarter of a wavelength of a signal having the frequency of the passband center frequency of the microwave filter.

12. An electrical filter structure comprising:

a microwave filter comprising a passband center frequency;

a transmission line comprising a plurality of transmission line portions coupled by a plurality of junctions, wherein the plurality of transmission line portions comprise a length (TL);

a plurality of stubs (N) coupled to the transmission line;
a first port coupled to a first junction of the plurality of junctions; and
a second port coupled to a last junction of the plurality of junctions,
wherein the plurality of stubs comprise a length (SST), wherein SST is determined according to the equation SST(k)=SST(N+1−k), wherein k is a positive integer.

13. The electrical filter structure according to claim 12, wherein the plurality of stubs comprise electrical lengths that are at least 2% longer than a quarter of a wavelength of a signal having a frequency of the passband center frequency of the microwave filter.

14. The electrical filter structure according to claim 12, wherein the microwave filter has a symmetrical structure.

15. The electrical filter structure according to claim 12, wherein the plurality of stubs comprises N stubs having lengths, SST(s), with 1≤s≤N and N−1 transmission line portions having lengths, TLs, wherein the plurality of stubs are configured according to the equation ST(k)=ST(N+1−k), [k≤floor(N/2)], wherein k is a positive integer.

16. The electrical filter structure according to claim 15, wherein the plurality of transmission line portions are configured according to TL(k)=TL(N−k), [k≤floor(N/2)].

17. The electrical filter structure according claim 12, wherein the microwave filter comprises a Chebyshev filter characterized with a pass-band ripple of 0.1 dB in a tolerance of +/−5 percent.

18. The electrical filter structure according claim 12, wherein the microwave filter comprises a Chebyshev filter characterized with a pass-band ripple of 0.1 dB in a tolerance of +/−2 percent.

19. The electrical filter structure according to claim 12, wherein the microwave filter comprises a band pass filter.

* * * * *